United States Patent [19]

Stiehler

[11] Patent Number: 5,398,089
[45] Date of Patent: Mar. 14, 1995

[54] TAKEUP SPOOL DRIVE WITH CLUTCH MECHANISM AND METHOD OF OPERATION

[75] Inventor: Wayne E. Stiehler, Spencerport, N.Y.

[73] Assignee: Eastman Kodak Company, Rochester, N.Y.

[21] Appl. No.: 200,250

[22] Filed: Feb. 23, 1994

[51] Int. Cl.⁶ .............................................. G03B 1/18
[52] U.S. Cl. .................................. 354/173.1; 354/212
[58] Field of Search ............ 354/212, 213, 214, 173.1, 354/173.11

[56] References Cited

U.S. PATENT DOCUMENTS

| | | | |
|---|---|---|---|
| Re. 33,436 | 11/1990 | Araki et al. ........................ | 354/173.1 |
| 3,423,041 | 1/1969 | Steisslinger et al. ................. | 354/213 |
| 4,171,892 | 10/1979 | Kozuki et al. ..................... | 354/173.1 |
| 4,251,148 | 2/1981 | Stemme et al. .................... | 354/173.1 |
| 4,258,988 | 3/1981 | Lermann et al. ................... | 354/173.1 |
| 4,274,726 | 6/1981 | Yoneyama et al. ................. | 354/173.1 |
| 4,342,509 | 8/1982 | Wakabayashi et al. ........... | 354/173.1 |
| 4,402,468 | 9/1983 | Tezuka et al. ..................... | 242/584.1 |
| 4,477,162 | 10/1984 | Matsumoto et al. ............. | 354/173.11 |
| 4,506,965 | 3/1985 | Kitajima et al. ................. | 354/173.1 |
| 4,548,304 | 10/1985 | Nagata ................................... | 192/46 |
| 4,619,509 | 10/1986 | Aoshima et al. .................. | 354/173.1 |
| 4,699,489 | 10/1987 | Nii ........................................... | 354/212 |
| 4,949,109 | 8/1990 | Shimada et al. .................. | 354/173.1 |
| 4,959,672 | 9/1990 | Yoshino et al. ................... | 354/173.1 |
| 4,967,213 | 10/1990 | Han ..................................... | 354/173.1 |
| 5,016,031 | 5/1991 | Shimada et al. .................. | 354/173.1 |

*Primary Examiner*—Howard B. Blankenship
*Attorney, Agent, or Firm*—Peter J. Bilinski

[57] ABSTRACT

A takeup spool drive for motorized camera film winding mechanisms and the like has a clutch mechanism with simplified components including a driver, a driven member such as a pinion gear and a takeup spool. The driver has lugs that drive the pinion gear in both directions with lash. Fingers on flexing arms of the driver engage internal teeth of the takeup spool to drive it in a forward film takeup direction. The fingers are disengaged by lash takeup in the reverse direction that causes inward flexing of the arms and allows free running of the spool. In addition to selective engaging and de-clutching drive of the takeup spool, the mechanism fingers re-engage the internal teeth upon momentary forward rotation for lash takeup and thereby lock the free running takeup spool when the motor is stationary after a winding movement, such as when the film registers in a film gate.

6 Claims, 2 Drawing Sheets

TAKEUP SPOOL DRIVE WITH CLUTCH MECHANISM AND METHOD OF OPERATION

FIELD OF THE INVENTION

This invention relates to drives with clutch mechanisms for takeup spools such as may be used in film winding mechanisms for cameras and the like and to methods of operating such drives.

BACKGROUND OF THE INVENTION

It is known in the art relating to motor driven camera film winding mechanisms to provide a motor with a winding system drivingly connected with two takeup spools or other take-up means, for advancing and re-winding a film roll. To prevent lockup of the system due to varying speeds of the two spools, clutch mechanisms are provided in the spool drives to permit the motor to drive only one of the spools at a time. However, prior clutch mechanisms require the assembly of several small parts to manufacture and do not lock the position of the following takeup spool when the film is advanced to register in an associated camera film gate.

SUMMARY OF THE INVENTION

The present invention solves the above concerns by providing a takeup spool drive mechanism including a takeup spool, a driver and a driven member, said spool having internal drive teeth and being mounted for rotation on an axis in forward and reverse directions, is characterized by:

said driven member being rotatably mounted on said axis and having a flange extending within said spool, said flange having first and second angularly spaced openings aligned laterally with said drive teeth, each said opening being defined by angularly opposite edges of said flange;

said driver being rotatably mounted on said axis and within said flange;

said driver including a radially projecting lug extending into said first opening of the flange, said lug being engagable with said opposite edges defining said first opening for driving said driven member in either forward or reverse directions of rotation, said lug being sufficiently narrower than said first opening to provide lash allowing limited oscillating movement of said driver relative to said flange; and said driver further including an outwardly biased radially movable finger extending through said second opening into engagement with said drive teeth for driving said spool in said forward direction when said lug is positioned against one of said edges of the first opening with the lash taken up in said forward direction of rotation;

said finger and one of said opposite edges defining said second opening having cooperating angled surfaces operative to cam said finger radially inward out of engagement with said drive teeth when said driver is oscillated relative to said flange to take up said lash in said reverse direction, said spool being thereby freed for rotation about said driver.

The present invention provides a spool drive with an improved clutch mechanism for camera film winding mechanisms and the like. The improved clutch mechanism includes only three components. In addition to selective engaging or declutching the drive of an associated takeup spool, the drive mechanism may be also operated to engage the clutch and lock the free running takeup spool at the end of a winding movement, such as when the film registers in the film gate.

These and other features and advantages of the invention will be more fully understood from the following detailed description of the invention taken together with the accompanying drawings.

DETAILED DESCRIPTION OF THE INVENTION

Figure 1:
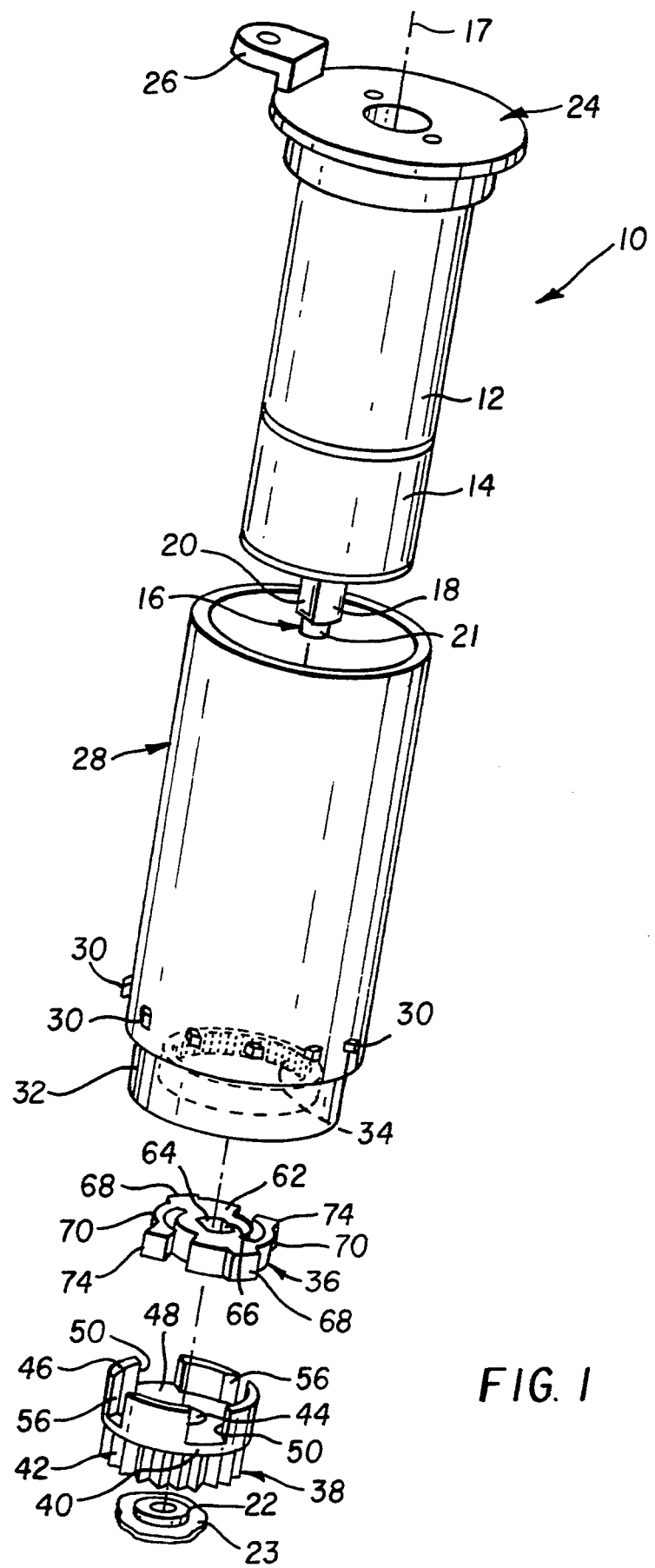
FIG. 1 is an exploded pictorial view of a film takeup spool drive, including a clutch mechanism according to the invention.

Referring now to the drawings in detail, numeral 10 generally indicates a takeup spool drive assembly for a motorized roll film camera. The details of the operation of a camera, such as exposure of film loaded into a body etc., are conventionally known and are not detailed further. The assembly 10 includes a drive motor 12 assembled together with a gearhead 14 having an output shaft 16 rotatable on an axis 17. The exposed end 18 of shaft 16 includes flats 20 and an outer end 21 of smaller diameter. The end 21 is received in a piloting bushing 22 attached to a fixed mounting plate 23.

The motor 12 is supported in a camera housing, not shown, by a motor mount 24 having at least one mounting tab 26. Rotatably mounted around the motor 12 and gearhead 14 is a hollow cylindrical film takeup spool 28 centered on the axis 17 and having annularly spaced angled drive tangs 30 near one end adjacent the exposed end of the shaft 16. A reduced diameter portion of the spool 28 forms a bearing journal 32 having an inner ring of internal drive teeth 34.

Mounted on the end 18 of the shaft 16 and the coaxial piloting bushing 22 are a driver 36 and a pinion gear 38. These, together with the internal teeth 34 of the takeup spool comprise the clutch mechanism for the spool drive of the invention. The gear 38 has a hub 40 with an outer ring of teeth 42 and a central axial bore 44. The bore 44 is received on the bushing 22 centered about the outer end 21 of the shaft 16 for free rotation of the hub thereon. The pinion gear 38 includes an annular flange 46 extending axially from the periphery of the hub 40 toward the gearhead 14 and forming a pocket 48 in which the driver 36 is received. The flange 48 is broken by a pair of oppositely located square edged lug openings 50, each having edge walls 52, 54. Also, angularly spaced from the lug openings 50 are a pair of oppositely located finger openings 56, each having angled edges 58, 60.

The driver 36 has a flat sided body 62 fitting loosely within the pocket 48. A central drive opening 64 having flats 66 is received on the end 18 of the output shaft 16, drivingly engaging its flats 20 for rotating the driver 36 with the shaft 16. A pair of drive lugs 68 extend radially from the body 62 into the lug openings 50 of the gear flange 46. The lugs 68 are made narrower than the openings 50, allowing a desired free movement or lash of the lugs 68 within the edge walls 52, 54. The driver body 62 also carries a pair of curved flexing arms 70. The arms 70 extend from the body 62 near the lugs 68 to enlarged ends 72 adjacent the finger openings 56 in the gear flange 46. The ends 72 define pointed fingers 74 capable of extending through the openings 56 to engage the internal drive teeth 34 in the bearing journal of the takeup spool 28. Angled edges 76, 78 of the fingers 74 mate with corresponding edges 58, 60, respectively, of the flange openings 56 when fingers 74 and teeth 34 are engaged as is shown in FIG. 2.

In operation, rotation of the drive motor 12 connected with the gearhead 14 causes rotation about the axis 17 of the output shaft 16 and the directly connected driver 36.

Figure 2:
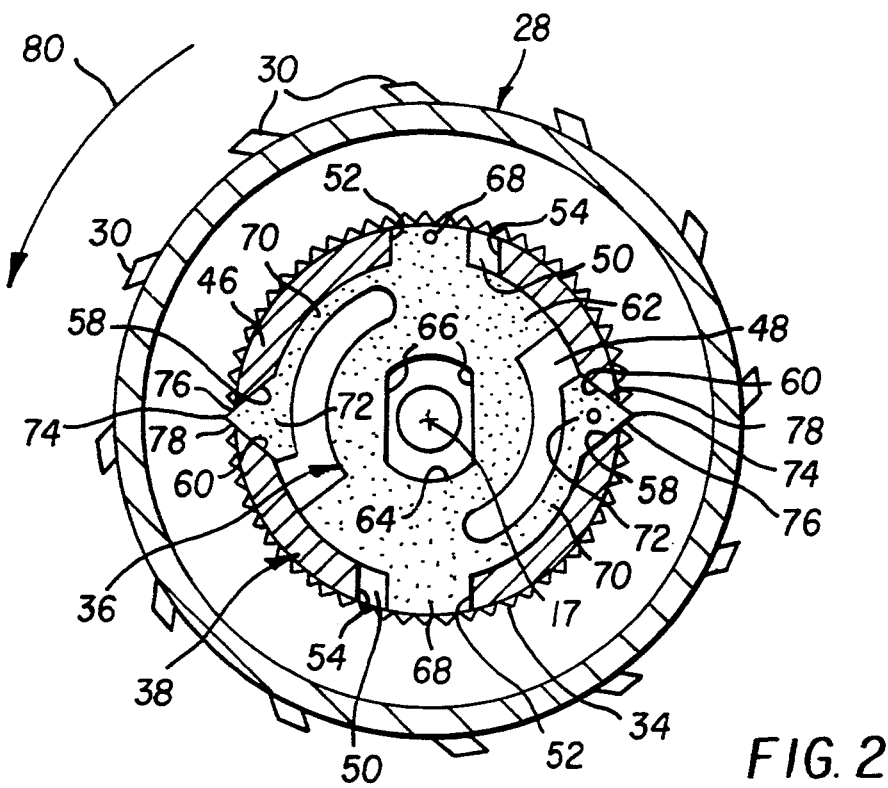
FIG. 2 is a semi-schematic view of the takeup spool drive illustrating engaged operation of the clutch mechanism.

When the driver 36 is rotated in a counterclockwise direction as shown by arrow 80 in FIG. 2, the drive lugs 68 move counterclockwise in the lug openings 50, taking up the lash in that direction and engaging the edge walls 52 of the pinion gear flange 46. This allows the fingers 74 of the flexing arms 70 to extend through the openings 56 and engage the teeth 34 as shown. In this condition, the driver 36, through the fingers 74, directly drives the takeup spool 28 counterclockwise to wind film, not shown, onto the spool 28 through engagement of the drive tangs 30 with mating perforations provided in the film. At the same time, the driver 36, through the lugs 68 and edge walls 52, drives the pinion gear 38 in a counterclockwise direction to operate other portions, not shown, of an exemplary film transport mechanism in which the gear 38 is connected.

Figure 3:
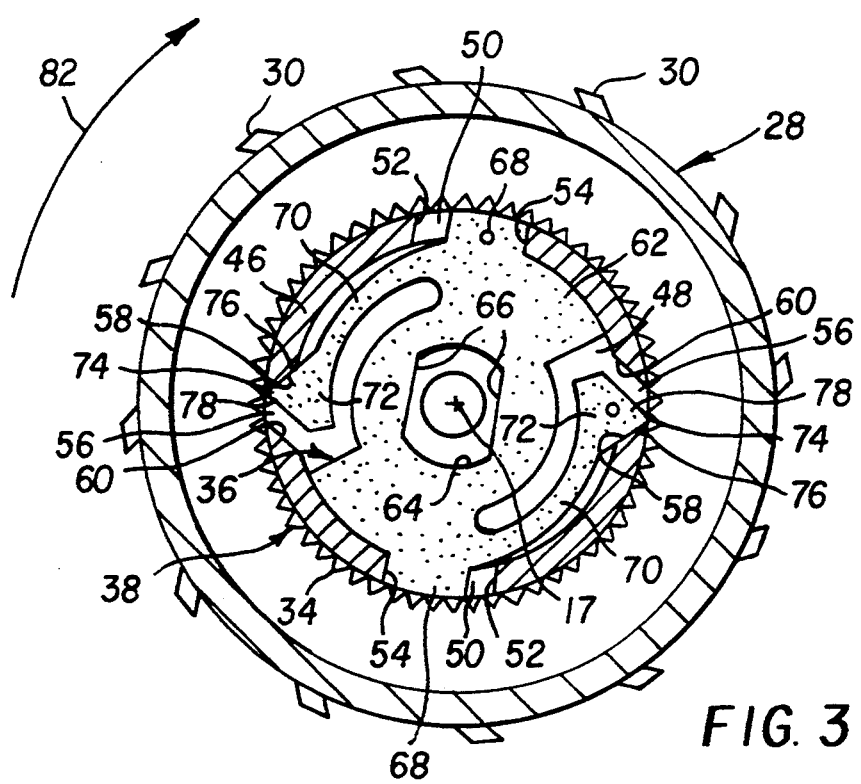
FIG. 3 is a semi-schematic view similar to FIG. 2, but illustrating disengaged operation of the clutch mechanism.

When the motor 12 is reversed, the driver 36 is rotated clockwise as shown by arrow 82 in FIG. 3. The drive lugs 68 then move clockwise in the lug openings 50 taking up the clockwise lash and engaging the edge walls 54 of the pinion gear flange 46. The lash takeup motion also moves the flexing arms 70 clockwise relative to the pinion gear 38, causing the edges 76 of the ends 72 of the flexing arms to cam the ends 72 inward along the angled edges 58 of the pinion gear flange 46. The fingers 74 are thereby disengaged from the internal drive teeth 34, declutching the drive between the driver 36 and the takeup spool 28 and allowing free rotation of the spool 28. At the same time the driver 36, through the lugs 68 and edge walls 54, drives the pinion gear 38 in a clockwise direction to operate the other portions of the film transport mechanism. This action could be used, for example, to advance film in an associated film gate, not shown.

When the desired film travel is completed and the film is registered in the film gate, the motor 12 may be momentarily reversed to back up the driver 36 an amount sufficient only to again take up the lash in the counterclockwise direction with the driver lugs 68 engaging the edge walls 52 of the pinion gear flange 46 as in FIG. 2. This allows the fingers 74 to again pass through the finger openings 56 and engage the internal gear teeth 34 as in FIG. 2. This then couples the gearhead 14 to the takeup spool 28 (through driver 36 and teeth 34) preventing the spool 28 from rotating while the drive motor 12 is stationary. In the exemplary film transport mechanism, not shown, this would help maintain the registered position of the film in the associated film gate.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 10. spool drive assembly | 44. bore |
| 12. drive motor | 46. flange |
| 14. gearhead | 48. pocket |
| 16. output shaft | 50. lug openings |
| 17. axis | 52. edge wall |
| 18. exposed end | 54. edge wall |
| 20. flats | 56. finger openings |
| 21. outer end | 58. angled edge |
| 22. piloting bushing | 60. angled edge |
| 23. mounting plate | 62. body |
| 24. motor mount | 64. drive opening |
| 26. mounting tab | 66. flats |
| 28. takeup spool | 68. drive lugs |
| 30. drive tangs | 70. flexing arms |
| 32. bearing journal | 72. ends |
| 34. internal drive teeth | 74. fingers |
| 36. driver | 76. edges |
| 38. pinion gear | 78. edges |
| 40. hub | 80. arrow |
| 42. teeth | 82. arrow |

What is claimed is:

1. A takeup spool drive mechanism including a takeup spool, a driver and a driven member, said spool having internal drive teeth and being mounted for rotation on an axis in forward and reverse directions, is characterized by:

said driven member being rotatably mounted on said axis and having a flange extending within said spool, said flange having first and second angularly spaced openings aligned laterally with said drive teeth, each said opening being defined by angularly opposite edges of said flange;

said driver being rotatably mounted on said axis and within said flange;

said driver including a radially projecting lug extending into said first opening of the flange, said lug being engagable with said opposite edges defining said first opening for driving said driven member in either forward or reverse directions of rotation, said lug being sufficiently narrower than said first opening to provide lash allowing limited oscillating movement of said driver relative to said flange; and said driver further including an outwardly biased radially movable finger extending through said second opening into engagement with said drive teeth for driving said spool in said forward direction when said lug is positioned against one of said edges of the first opening with the lash taken up in said forward direction of rotation;

said finger and one of said opposite edges defining said second opening having cooperating angled surfaces operative to cam said finger radially inward out of engagement with said drive teeth when said driver is oscillated relative to said flange to take up said lash in said reverse direction, said spool being thereby freed for rotation about said driver.

2. A mechanism as recited in claim 1 wherein said driver includes an integral flexing arm and said finger extends outward from an outwardly biased end of said arm.

3. A mechanism as recited in claim 2 wherein said arm extends circumferentially within said flange toward said finger in the direction of forward rotation of said spool and said cooperating angled surfaces are on a side of said finger in the direction of reverse rotation of said spool.

4. A mechanism as recited in claim 1 wherein said spool is hollow and internally receives a drive motor and gearhead assembly having an output shaft drivably connected with the driver, the driven member being supported for rotation on the shaft.

5. A mechanism as recited in claim 1 wherein the takeup spool is hollow and the takeup spool drive further includes a drive motor assembly mounted within the spool, said motor assembly including an axially extending output shaft mounted for rotation on said axis in forward and reverse directions, said spool further having means adapted for gripping film for takeup on the spool in said forward direction of rotation, characterized by:

said driven member comprising a pinion gear rotatably mounted on said shaft, said flange extending within said spool and said first and second angularly spaced openings comprising pairs of opposed openings aligned laterally with said drive teeth;

said driver being drivably mounted on said shaft and including a pair of said radially projecting lugs extending into said first openings of the flange, said lugs being engagable with said opposite edges of the flange defining the respective ones of said first openings for driving said pinion gear in either forward or reverse directions of rotation, said lugs being sufficiently narrower than their associated first openings to provide said lash; and said driver further including a pair of outwardly biased integral flexing arms each including one of said radially movable fingers extending through one of said second openings into engagement with said drive teeth when said lugs are each positioned against one of said edges of their associated first openings with the lash taken up in said forward direction of rotation for driving said spool in said forward direction;

said fingers and one of said opposite edges of the flange defining each of said second openings having said cooperating angled surfaces operative to cam said fingers radially inward out of engagement with said drive teeth when said driver is oscillated relative to said flange to take up said lash in said reverse direction, said spool being thereby freed for rotation about said driver.

6. A method of operating a film takeup spool drive having a reversible motorized drive including lash and a directionally operable clutch mechanism that disengages during forward rotation for film advance movements and reengages after lash takeup during reverse operation for film takeup movements, said method characterized by the steps of:

operating the drive in a forward direction to disengage the clutch mechanism while advancing the film to a desired position;

stopping the drive upon reaching by the film of said position; and reversing the drive momentarily an amount sufficient to take up the lash and engage the clutch mechanism without changing the film position, thereby locking the spool against further motion while the drive remains stationary.

* * * * *